United States Patent
Han et al.

(10) Patent No.: US 10,956,705 B2
(45) Date of Patent: Mar. 23, 2021

(54) FINGERPRINT RECOGNITION DEVICE AND DISPLAY DEVICE AND MOBILE TERMINAL USING FINGERPRINT RECOGNITION DEVICE

(71) Applicant: LG Display Co., Ltd., Seoul (KR)

(72) Inventors: Manhyeop Han, Paju-si (KR); Jiho Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 16 days.

(21) Appl. No.: 16/224,587

(22) Filed: Dec. 18, 2018

(65) Prior Publication Data

US 2019/0197287 A1 Jun. 27, 2019

(30) Foreign Application Priority Data

Dec. 21, 2017 (KR) .................. 10-2017-0177593

(51) Int. Cl.
| | |
|---|---|
| G06K 9/00 | (2006.01) |
| G06F 3/041 | (2006.01) |
| G02B 6/12 | (2006.01) |
| G06F 21/32 | (2013.01) |
| H01L 27/32 | (2006.01) |

(52) U.S. Cl.
CPC ....... *G06K 9/0004* (2013.01); *G02B 6/12004* (2013.01); *G06F 3/0412* (2013.01); *G06F 21/32* (2013.01); *G06K 9/0008* (2013.01); *G06K 9/00087* (2013.01); *H01L 27/3234* (2013.01)

(58) Field of Classification Search
None
See application file for complete search history.

(56) References Cited

U.S. PATENT DOCUMENTS

| | | | |
|---|---|---|---|
| 7,609,864 B2 | 10/2009 | Nagasaka et al. | |
| 7,881,506 B2 | 2/2011 | Nagasaka et al. | |
| 8,103,064 B2 | 1/2012 | Nagasaka et al. | |
| 2003/0051138 A1* | 3/2003 | Maeda | G06F 21/32 |
| | | | 713/168 |
| 2004/0252867 A1 | 12/2004 | Lan et al. | |
| 2006/0098848 A1 | 5/2006 | Nagasaka et al. | |
| 2007/0013679 A1 | 1/2007 | Gruhlke | |

(Continued)

FOREIGN PATENT DOCUMENTS

| | | |
|---|---|---|
| CN | 105184282 A | 12/2015 |
| EP | 1654984 A2 | 5/2006 |

(Continued)

OTHER PUBLICATIONS

Intellectual Property Office, Combined Search and Examination Report, United Kingdom Patent Application No. GB1820952.8, dated Jun. 18, 2019, 8 pages.

*Primary Examiner* — Nicholas J Lee
(74) *Attorney, Agent, or Firm* — Fenwick & West LLP

(57) ABSTRACT

A fingerprint recognition system may comprise: a display panel configured to display an image on a screen; a light source device configured to irradiate light onto a transparent substrate disposed on the screen of the display panel; an image sensor configured to obtain a fingerprint image with light reflected from a fingerprint contacting the transparent substrate on the screen; and an image sensor controller configured to control an exposure time of the image sensor to obtain the fingerprint image based on a contrast ratio of the fingerprint image.

13 Claims, 10 Drawing Sheets

(56) References Cited

U.S. PATENT DOCUMENTS

| | | |
|---|---|---|
| 2010/0021024 A1 | 1/2010 | Nagasaka et al. |
| 2011/0085711 A1 | 4/2011 | Nagasaka et al. |
| 2013/0063399 A1 | 3/2013 | Noro et al. |
| 2016/0306491 A1* | 10/2016 | Lee ..................... G06F 3/04883 |
| 2017/0085813 A1* | 3/2017 | Reinhold ............. H04N 5/3532 |
| 2017/0169271 A1* | 6/2017 | Setterberg ............ G06K 9/0002 |
| 2017/0270340 A1 | 9/2017 | Gao et al. |
| 2018/0357460 A1* | 12/2018 | Smith .................. G02B 5/3025 |
| 2019/0057237 A1* | 2/2019 | Zuo ..................... G06K 9/0004 |
| 2019/0180078 A1* | 6/2019 | Hall .................... G06K 9/0002 |

FOREIGN PATENT DOCUMENTS

| | | |
|---|---|---|
| EP | 3299947 A | 3/2018 |
| KR | 10-2006-0052429 A | 5/2006 |
| KR | 10-2017-0124160 A | 11/2017 |
| KR | 10-2019-0018334 A | 2/2019 |
| WO | WO 2009/010940 A2 | 1/2009 |
| WO | WO 2015/108477 A1 | 7/2015 |

\* cited by examiner $T_{CP\_AIR} < \alpha < T_{EHOE\_LR} < \theta$ ex) $45° < \alpha < 55°$
$70° < \theta < 75°$

FINGERPRINT RECOGNITION DEVICE AND DISPLAY DEVICE AND MOBILE TERMINAL USING FINGERPRINT RECOGNITION DEVICE

CROSS-REFERENCE TO RELATED APPLICATIONS

This application claims the benefit of Republic of Korea Patent Application No. 10-2017-0177593 filed on Dec. 21, 2017, the entire contents of which is incorporated herein by reference in its entirety.

BACKGROUND

Field of Technology

The present disclosure relates to a fingerprint recognition device and a display device and a mobile terminal using the fingerprint recognition device.

Discussion of the Related Art

Biometrics recognize unchanging physical characteristics of people, such as fingerprint and voice, for the identification of registered users. Examples of biometric data used in biometrics include fingerprint, face, and iris. Various biometrics has been recently applied to various information devices for the purpose of information security. In case of high-end smartphones, biometrics is being applied competitively.

A fingerprint recognition device is a typical biometric system used in most information devices. However, an optical fingerprint recognition device has a disadvantage in that there is a large difference in a fingerprint recognition rate depending on a fingerprint status and an environment of a user.

SUMMARY

In one embodiment, a fingerprint recognition system comprises: a display panel configured to display an image on a screen; a light source device configured to irradiate light onto a transparent substrate disposed on the screen of the display panel; an image sensor configured to obtain a fingerprint image with light reflected from a fingerprint contacting the transparent substrate on the screen; and an image sensor controller configured to control an exposure time of the image sensor to obtain the fingerprint image based on a contrast ratio of the fingerprint image.

In one embodiment, a method for sensing a fingerprint using a fingerprint recognition display device including an image sensor comprises: obtaining a fingerprint image with light reflected from a fingerprint contacting the fingerprint recognition display device; and controlling an exposure time of the image sensor to obtain the fingerprint image based on a contrast ratio of the fingerprint image.

In one embodiment, a method for sensing a fingerprint using a fingerprint recognition display device comprises: sensing a plurality of fingerprints on the fingerprint recognition display device using a plurality of different exposure times; selecting a fingerprint from the sensed fingerprints that has a highest contrast from among the plurality of fingerprints; comparing the selected fingerprint with a previously stored fingerprint; and allowing access to the fingerprint recognition display device responsive to the selected fingerprint matching the previously stored fingerprint.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION

Figure 1A:
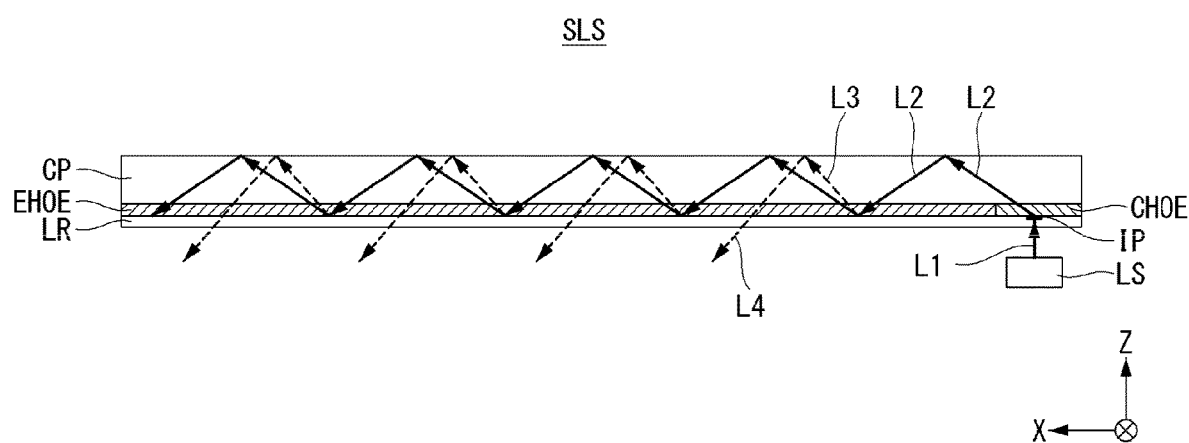
FIGS. 1A and 1B illustrate a directional light source device according to an embodiment of the disclosure.

Reference will now be made in detail to embodiments of the disclosure, examples of which are illustrated in the accompanying drawings. However, the present disclosure is not limited to embodiments disclosed below, and may be implemented in various forms. These embodiments are provided so that the present disclosure will be described more completely, and will fully convey the scope of the present disclosure to those skilled in the art to which the present disclosure pertains. Particular features of the present disclosure can be defined by the scope of the claims.

Shapes, sizes, ratios, angles, number, and the like illustrated in the drawings for describing embodiments of the disclosure are merely exemplary, and the present disclosure is not limited thereto unless specified as such. Like reference numerals designate like elements throughout. In the following description, when a detailed description of certain functions or configurations related to this document that may unnecessarily cloud the gist of the disclosure have been omitted.

In the present disclosure, when the terms "include", "have", "comprised of", etc. are used, other components may be added unless "~ only" is used. A singular expression can include a plural expression as long as it does not have an apparently different meaning in context.

In the explanation of components, even if there is no separate description, it is interpreted as including margins of error or an error range.

In the description of positional relationships, when a structure is described as being positioned "on or above", "under or below", "next to" another structure, this description should be construed as including a case in which the structures directly contact each other as well as a case in which a third structure is disposed there between.

The terms "first", "second", etc. may be used to describe various components, but the components are not limited by such terms. The terms are used only for the purpose of distinguishing one component from other components. For example, a first component may be designated as a second component, and vice versa, without departing from the scope of the present disclosure.

The features of embodiments of the disclosure can be partially combined or entirely combined with each other, and can be technically interlocking-driven in various ways. The embodiments can be independently implemented, or can be implemented in conjunction with each other.

A fingerprint recognition device according to embodiments of the disclosure is an optical fingerprint recognition device and senses a fingerprint image contacting a screen of a display device. The fingerprint recognition device according to embodiments of the disclosure may be applied to flat panel displays such as a liquid crystal display (LCD), an electroluminescent display, a field emission display (FED), and a plasma display panel (PDP). The electroluminescent display is classified into an inorganic light emitting display and an organic light emitting display depending on a material of an emission layer. An active matrix organic light emitting diode (OLED) display includes pixels each including an organic light emitting diode capable of emitting light by itself. The OLED display has many advantages of fast response time, high emission efficiency, high luminance, wide viewing angle, and the like. Further, the OLED display can represent a black gray level as a complete black color and thus is excellent in a contrast ratio and a color representation. In the following description, embodiments of the disclosure are described using an OLED display as an example of a display device. However, embodiments are not limited thereto.

In the following embodiments, an electroluminescent display is described focusing on an OLED display including an organic light emitting material. However, the technical idea of the present disclosure is not limited to the OLED display and may be applied to an inorganic light emitting display including an inorganic light emitting material.

A fingerprint recognition device according to embodiments of the disclosure may irradiate a surface light source onto a fingerprint contacting a screen of a display device using a directional light source device and an image sensor illustrated in FIGS. 1A to 4.

Figure 1B:
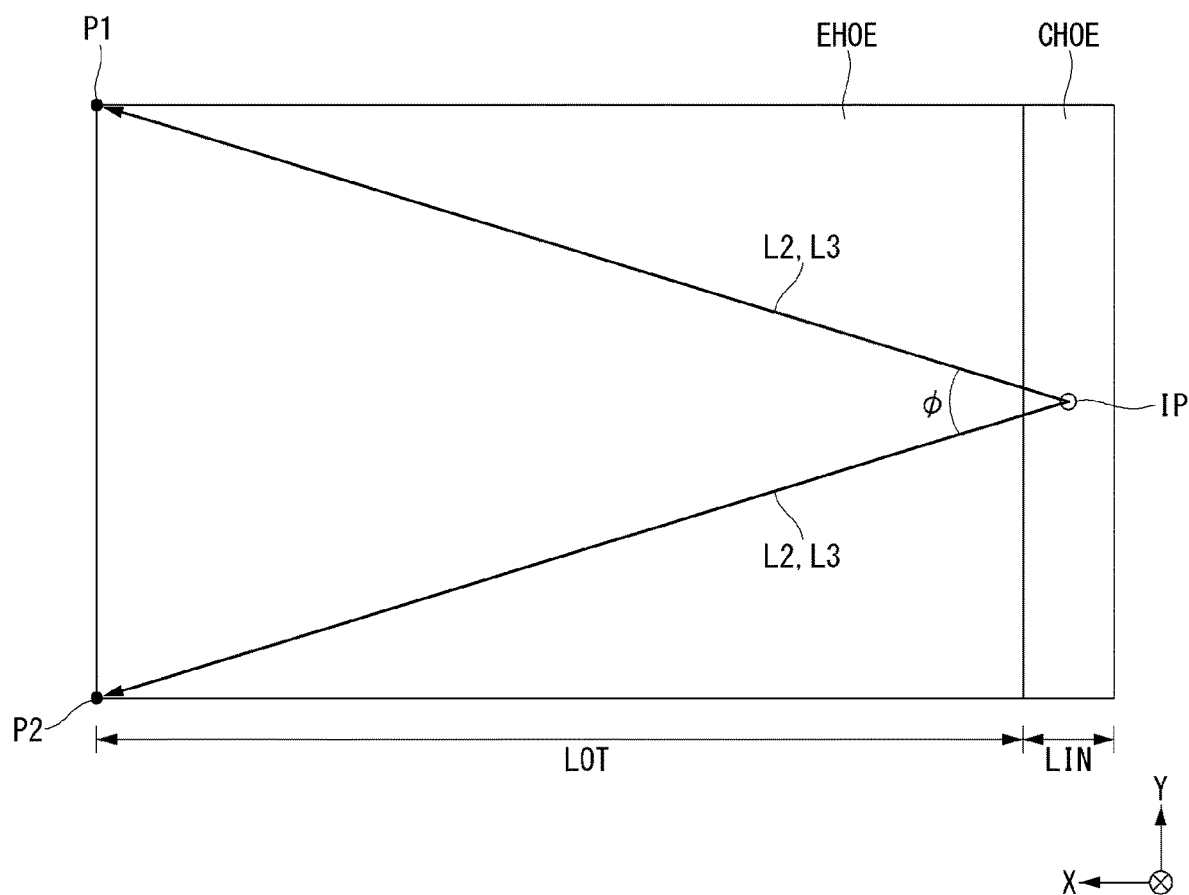
Figure 2:
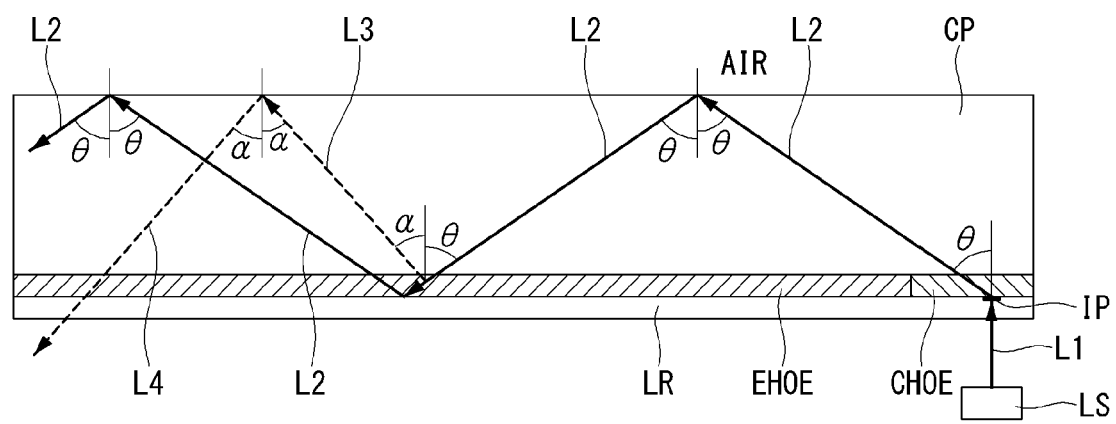
FIG. 2 is a cross-sectional view illustrating a light path in a transparent substrate shown in FIGS. 1A and 1B according to an embodiment of the disclosure.
Figure 3A:
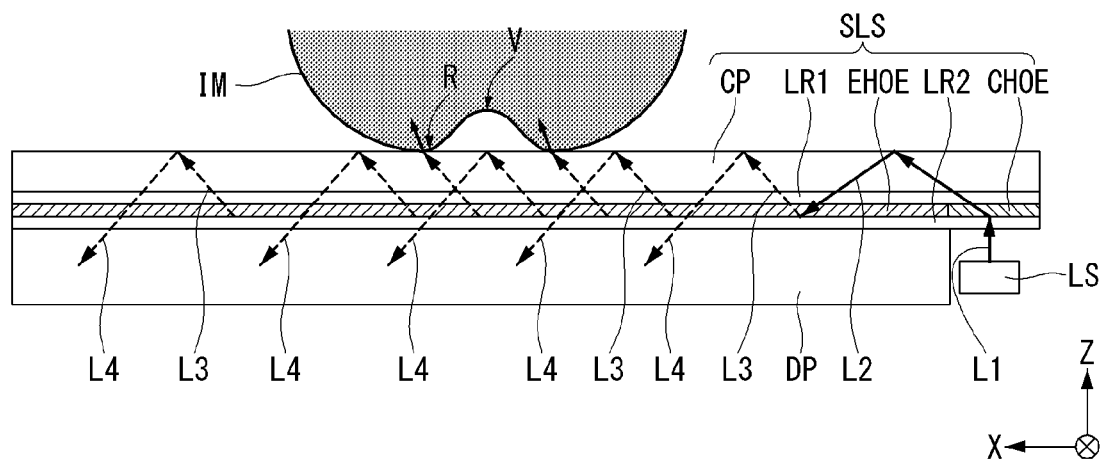
FIGS. 3A and 3B illustrate a directional light source device on a display panel according to an embodiment of the disclosure.
Figure 3B:
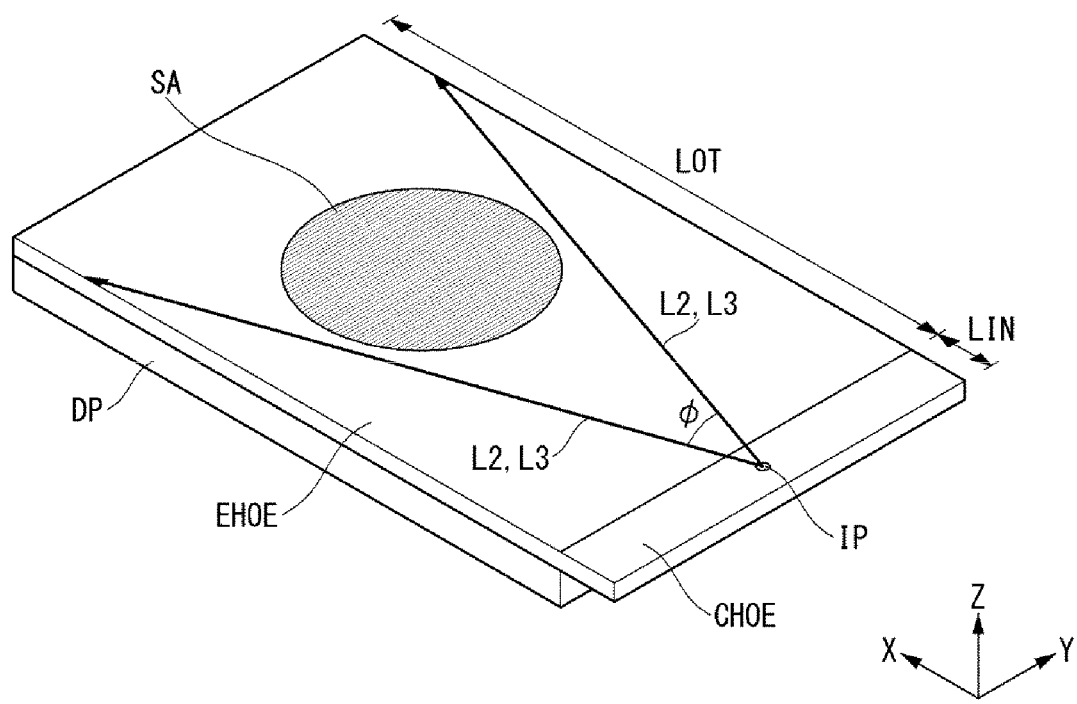

FIGS. 1A and 1B illustrate a directional light source device according to an embodiment of the disclosure. More specifically, FIG. 1A is a cross-sectional view illustrating a cross-sectional structure of a directional light source device, and FIG. 1B is a plan view illustrating a light path shown in FIG. 1A on the plane of a directional light source device. FIG. 2 is a cross-sectional view illustrating a light path in a transparent substrate shown in FIGS. 1A and 1B. FIGS. 3A and 3B illustrate a directional light source device on a display panel according to an embodiment of the disclosure. More specifically, FIG. 3A is a cross-sectional view illustrating a display panel and a directional light source device, and FIG. 3B is a perspective view illustrating a light path and a fingerprint sensing region shown in FIG. 3A.

Referring to FIGS. 1A to 3, a fingerprint recognition device according to an embodiment of the disclosure includes a directional light source device SLS which may be disposed on a screen of a display device. The directional light source device SLS includes a transparent substrate CP, a light source LS, a light entering element CHOE, a light exiting element EHOE, and a low refractive index layer LR in one embodiment. The transparent substrate CP may be a substrate of a display panel, on which the screen of the display device is displayed, or a cover substrate covering the display panel.

The directional light source device SLS is an optical device for diffusing collimated light into a large area within the transparent substrate CP. The light source LS may provide collimated light. The light source LS irradiates laser light of an infrared band or a visible band onto the light entering element CHOE.

The light entering element CHOE is disposed between the light source LS and the transparent substrate CP and refracts light from the light source LS at an angle at which light is able to be totally reflected within the transparent substrate CP. The light exiting element EHOE is disposed between a display panel DP (see FIG. 3B) and the transparent substrate CP on a screen of the display panel DP. The light exiting element EHOE refracts a portion of light travelling within the transparent substrate CP so that the portion of light travelling within the transparent substrate CP can travel toward the display panel DP through a lower surface of the transparent substrate CP. The low refractive index layer LR is disposed between the light exiting element EHOE and the display panel DP and has a refractive index less than a refractive index of the light exiting element EHOE.

The light exiting element EHOE and the light entering element CHOE are attached to the lower surface of the transparent substrate CP. The light exiting element EHOE is an optical element providing outgoing light L3. A pixel array of the display panel DP is displayed below the light exiting element EHOE. The screen of the display device indicates an area of the pixel array of the display panel DP on which an input image is displayed. An image sensor ISS is attached to the display panel DP and photoelectrically converts light reflected from a fingerprint of a user on the screen of the display panel DP, thereby obtaining a fingerprint image.

The light entering element CHOE is an optical element converting light from the light source LS so that light from the light source LS has collimation properties while being diffused into the transparent substrate CP. The light entering element CHOE has to face the light source LS. The collimated light from the light source LS may be vertically incident on the light entering element CHOE. The light entering element CHOE may be disposed at an edge of the display panel DP because it is not directly associated with the image recognition.

The light exiting element EHOE and the light entering element CHOE may be disposed on the same plane. The light exiting element EHOE and the light entering element CHOE may be formed in separate areas of one film in consideration of a manufacturing process. The light exiting element EHOE and the light entering element CHOE may be a holographic element. The light exiting element EHOE and the light entering element CHOE may be manufactured at the same time in a hologram recording process. In a state where a master film with a pattern of the light exiting element EHOE and a master film with a pattern of the light entering element CHOE are disposed adjacent to each other in the hologram recording process, a holographic pattern for light exiting element and a holographic pattern for light entering element may be simultaneously recorded on one film.

A hologram recording method may be classified into a transmission recording method and a reflection recording method. The transmission recording method irradiates reference light and object light onto one surface of a holographic film and records an interference pattern on a recording surface of the holographic film. When the reference light is irradiated onto one surface of the holographic film on which information is recorded using the transmission recording method, information of the object light is reconstructed with 1st order diffracted light generated by the interference pattern on the holographic film. At the same time, zeroth order diffracted light passing through the holographic film is generated.

The reflection recording method irradiates reference light and object light onto a holographic film with the holographic film interposed therebetween. In the reflection recording method, the reference light is irradiated onto one surface of the holographic film, and the object light is irradiated onto the other surface of the holographic film opposite the one surface of the holographic film. Hence, an interference pattern of the reference light and the object light is recorded on a recording surface of the holographic film. When the reference light is irradiated onto one surface of the holographic film on which information is recorded using the reflection recording method, information of the object light is reconstructed with 1st order diffracted light generated by the interference pattern on the holographic film. At the same time, zeroth order diffracted light passing through the holographic film is generated.

The 1st order diffracted light passing through the holographic film for light entering element is totally reflected within the transparent substrate CP, and the zeroth order diffracted light is transmitted by the holographic film and travels toward the transparent substrate CP. The fingerprint recognition device senses a fingerprint pattern of the user using the 1st order diffracted light which is refracted at the holographic film and is incident on the transparent substrate CP. The zeroth order diffracted light transmitted by the holographic film may be shielded by a deco film or a black matrix so that the light source LS is not visible to the user.

The low refractive index layer LR is disposed between a holographic film (including the elements CHOE and EHOE) and the display panel DP. The low refractive index layer LR has a refractive index less than the transparent substrate CP and the holographic film.

The transparent substrate CP may be made of a transparent substrate having a refractive index of 1.5. A refractive index of a holographic film including the light exiting element EHOE and the light entering element CHOE may be equal to or slightly greater than the refractive index of the transparent substrate CP. In embodiments disclosed herein, it is assumed that the refractive index of the holographic film (including the elements CHOE and EHOE) is equal to the refractive index of the transparent substrate CP for convenience of explanation. A refractive index of the low refractive index layer LR may be similar to a refractive index of a fingerprint IM (i.e., a human skin) to be recognized. For example, the low refractive index layer LR may have a refractive index of about 1.4 which is close to a refractive index "1.39" of the human skin.

The light source LS is positioned opposite the light entering element CHOE. In one embodiment, the light source LS may provide highly collimated light like a laser.

Collimated light of infrared band provided by the light source LS is incident light L1, and the incident light L1 has a predetermined cross-sectional area and is provided for an incident point IP defined on the light entering element CHOE. In one embodiment, the incident light L1 may enter in a normal direction to the surface of the incident point IP. However, embodiments are not limited thereto. For example, the incident light L1 may be incident at an angle inclined to a normal line of the surface of the incident point IP, if necessary or desired.

The light entering element CHOE refracts the incident light L1 to an incident angle of traveling light L2 and sends the traveling light L2 to the inside of the transparent substrate CP. In embodiments disclosed herein, the incident angle of the traveling light L2 may be greater than an internal total reflection critical angle of the transparent substrate CP. As a result, the traveling light L2 travels along an X-axis direction corresponding to a longitudinal direction of the transparent substrate CP while being totally reflected within the transparent substrate CP. Light from the light source LS is generated at an infrared wavelength that is not visible to the user.

The light exiting element EHOE converts a portion of the traveling light L2 into an outgoing light L3 and refracts the outgoing light L3 toward an upper surface of the transparent substrate CP. A remaining portion of the traveling light L2 is totally reflected within the transparent substrate CP and travels. The outgoing light L3 is totally reflected at the upper surface of the transparent substrate CP, but passes through the low refractive index layer LR at the lower surface of the transparent substrate CP. Namely, the outgoing light L3 serves as detection light (or referred to as "sensing light") L4 which is totally reflected at the upper surface of the transparent substrate CP and passes through the lower surface of the transparent substrate CP.

An amount of the outgoing light L3 is determined depending on light extraction efficiency of the light exiting element EHOE. For example, when the light extraction efficiency of the light exiting element EHOE is 3%, 3% of the incident light L1 travels at an angle of the outgoing light L3 in a first region where the traveling light L2 first contacts the light exiting element EHOE. Further, 97% of the incident light L1 as the traveling light L2 continues to be totally reflected and travel. Afterwards, in a second region, 2.91% of the incident light L1, which equals 3% of the remaining 97% of the incident light L1, travels at an angle of the outgoing light L3. In such a manner, the outgoing light L3 is generated until it reaches the far side of the transparent substrate CP opposite the light source LS. In order to provide a predetermined amount of the outgoing light L3 while the traveling light L2 travels within the transparent substrate CP, the light extraction efficiency of the light exiting element EHOE may be designed to gradually increase exponentially.

The traveling light L2 remains collimated as the incident light L1 has been collimated, when viewed on XZ plane (or referred to as "vertical plane") including a longitudinal direction axis and a thickness direction axis. On the other hand, the traveling light L2 may have a diffusion angle φ of FIG. 1B on XY plane (or referred to as "horizontal plane") including the longitudinal direction axis and a width direction axis. This is to set an image detection area correspondingly to the area of the transparent substrate CP. For example, the light exiting element EHOE may be disposed corresponding to an entire area of a light output portion LOT if possible. Further, the diffusion angle φ may be equal to or greater than an interior angle between two line segments connecting the incident point IP to two end points P1 and P2 on the other side of the transparent substrate CP opposite the light entering element CHOE.

A region where the light entering element CHOE is disposed may be defined as a light input portion LIN shown in FIG. 1B. A region where the light exiting element EHOE is disposed may be defined as the light output portion LOT. The light output portion LOT may be also defined as a total reflection portion in which the traveling light L2 propagates.

When a cross-sectional area of collimated light provided by the light source LS is about 0.5 mm×0.5 mm, the light entering element CHOE may have a length corresponding to a width of the transparent substrate CP and a width of about 3 mm to 5 mm. The light entering element CHOE may be disposed across the width of the transparent substrate CP.

With reference to FIG. 2, a description will be made about along which path collimated light provided by the light source LS is converted into directional light used in the fingerprint image sensing within the transparent substrate CP.

The incident light L1 from the light source LS enters in a normal direction to the surface of the incident point IP on the light entering element CHOE. The light entering element CHOE converts the incident light L1 into the traveling light L2 which is refracted to have an incident angle θ, and sends the traveling light L2 to the inside of the transparent substrate CP.

The incident angle θ of the traveling light L2 may be greater than a total reflection critical angle $T_{EHOE\_LR}$ at an interface between the light exiting element EHOE and the low refractive index layer LR. For example, when the refractive indexes of the transparent substrate CP and the light exiting element EHOE are 1.5 and the refractive index of the low refractive index layer LR is 1.4, the total reflection critical angle $T_{EHOE\_LR}$ R at the interface between the light exiting element EHOE and the low refractive index layer LR is about 69°. Thus, the incident angle θ may be greater than 69°. For example, the incident angle θ may be set to be between 70° and 75°.

The traveling light L2 is totally reflected from the upper surface of the transparent substrate CP because the upper surface of the transparent substrate CP is in contact with an air layer AIR. This is because a total reflection critical angle $T_{CP\_AIR}$ at an interface between the transparent substrate CP and the air layer AIR is about 41.4°. Namely, as long as the incident angle θ is greater than the total reflection critical angle $T_{EHOE\_LR}$ at the interface between the light exiting element EHOE and the low refractive index layer LR, the incident angle θ is always greater than the total reflection critical angle $T_{CP\_AIR}$ at the interface between the transparent substrate CP and the air layer AIR.

The light exiting element EHOE converts a predetermined amount of the traveling light L2 into the outgoing light L3 having a reflection angle α and sends the outgoing light L3 back to the inside of the transparent substrate CP. The outgoing light L3 is light for recognizing a pattern of the fingerprint IM contacting the upper surface of the transparent substrate CP. When there is no fingerprint on the surface of the transparent substrate CP, the outgoing light L3 has to be totally reflected from the upper surface of the transparent substrate CP and propagate to an image sensor disposed below the directional light source device SLS. After the outgoing light L3 is totally reflected from the upper surface of the transparent substrate CP, the outgoing light L3 serves as the detection light L4 and propagates under the directional light source device SLS.

Figure 4:
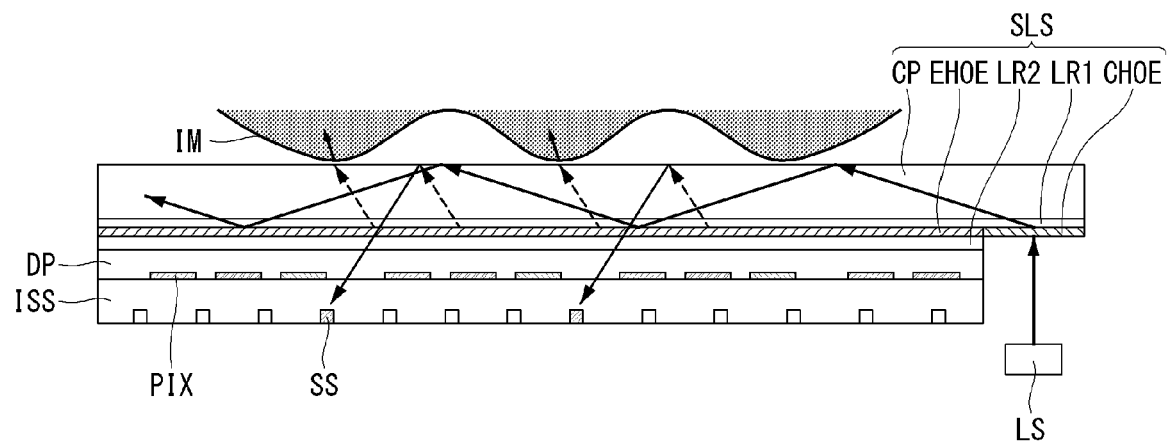
FIG. 4 is a cross-sectional view of a directional light source device on a display panel according to an embodiment of the disclosure.

As shown in FIGS. 3A and 4, the low refractive index layer may be disposed on and under the holographic film (including the elements CHOE and EHOE). A first low refractive index layer LR1 is disposed between the transparent substrate CP and the holographic film (including the elements CHOE and EHOE), and a second low refractive index layer LR2 is disposed between the holographic film (including the elements CHOE and EHOE) and the display panel DP. Refractive indexes of the low refractive index layers LR1 and LR2 may be about 1.4, but embodiments are not limited thereto. The low refractive index layers LR1 and LR2 may be implemented as an optical adhesive, for example, an optical clear adhesive (OCA).

As shown in FIGS. 3A and 3B, the display panel DP may be disposed under the directional light source device SLS.

An image sensor ISS may be embedded in the display panel DP or disposed below the display panel DP as shown in FIG. 4 to obtain a fingerprint image contacting the transparent substrate CP. Pixels SS of the image sensor ISS may be embedded in the display panel DP together with display pixels PIX of the display panel DP. The image sensor ISS may be attached to the substrate of the display panel DP using an adhesive such as an optical clear adhesive (OCA) and a pressure sensitive adhesive (PSA). However, embodiments are not limited thereto.

Referring to FIGS. 3A, 3B and 4, the incident light L1 is converted into the traveling light L2 by the light entering element CHOE. The traveling light L2 is converted in such a way that it has the diffusion angle φ on the XY plane which is the horizontal plane including an X-axis of the longitudinal direction axis and a Y-axis of the width direction axis. The traveling light L2 also maintains an originally collimated state (in which the incident light L1 has been collimated) on the XZ plane which is the vertical plane including the X-axis of the longitudinal direction axis and a Z-axis of the thickness direction axis.

In one embodiment, the diffusion angle φ may be equal to or greater than an interior angle between two line segments connecting the incident point IP to two end points on the other side of the transparent substrate CP opposite the light entering element CHOE. In this instance, the traveling light L2 propagates within the transparent substrate CP while being diffused in a triangular shape having the diffusion angle φ. The outgoing light L3 is also provided within the same range as the traveling light L2. As a result, a fingerprint sensing region SA may be selected within a triangle area that widens from the incident point IP with the diffusion angle φ. A circular hatched portion of FIG. 3B may be designated as the fingerprint sensing region SA. However, embodiments are not limited thereto.

When the fingerprint sensing region SA is formed in a center portion of the display panel DP or in a portion of an upper side of the display panel DP opposite the light entering element CHOE, it may be designed that an amount of the outgoing light L3 has a maximum value in the fingerprint sensing region SA. To this end, the light extraction efficiency of the light exiting element EHOE may be designed as a function of position so that it has a maximum value in a portion corresponding to the fingerprint sensing region SA and has a minimum value or a value close to zero in the other portions. Because the fingerprint sensing region SA has a large amount of light that is reflected from the fingerprint IM and travels toward the image sensor ISS, the fingerprint sensing region SA obtains a high fingerprint recognition rate.

When the fingerprint IM contacts the transparent substrate CP, light is reflected from the upper surface of the transparent substrate CP at a location of valleys V of the fingerprint IM, passes through the light exiting element EHOE and the low refractive index layer LR, and travels toward the display panel DP. Therefore, the light can reach the image sensor ISS. On the other hand, because light at ridges R of the fingerprint IM contacting the transparent substrate CP is absorbed in the human skin, the light does not reach the image sensor ISS.

The image sensor ISS converts the received light into an electrical signal and detects a fingerprint pattern. The pixel SS of the image sensor ISS includes a photoelectric conversion element, for example, a photodiode. The image sensor ISS amplifies (e.g., using an amplifier) a signal obtained from the photoelectric conversion elements of the pixels SS and converts the amplified signal into digital data through an analog-to-digital converter (ADC) to output fingerprint data. The image sensor ISS may output fingerprint image data as 8-bit data. The image sensor ISS outputs a ridge pattern of the fingerprint IM as data of a dark gray level and outputs a valley pattern of the fingerprint IM as data of a light gray level.

The embodiment of the disclosure can increase efficiency of light received by the image sensor ISS by disposing the image sensor ISS below the fingerprint sensing region SA as shown in FIG. 3B and can display an image indicating a location of the fingerprint sensing region SA on the screen so that a user can easily know the location of the fingerprint sensing region SA. The image sensor ISS may be embedded in the display panel DP and disposed below the display panel DP so that the image sensor ISS faces toward the fingerprint sensing region SA. The pixels SS of the image sensor ISS are positioned opposite the transparent substrate CP, the light exiting element EHOE, and the low refractive index layer LR of the directional light source device SLS.

The screen of the display panel DP includes the pixel array displaying an input image. The pixel array includes a plurality of data lines, a plurality of gate lines intersecting the data lines, and the display pixels PIX arranged in a matrix. Each display pixel PIX may include a red subpixel, a green subpixel, and a blue subpixel for color implementation. Each display pixel PIX may further include a white subpixel. Each subpixel may include a light emitting element such as an organic light emitting diode (OLED).

A sharpness of the fingerprint image output from the image sensor ISS may vary depending on a fingerprint state and a surrounding environment. When the sharpness of the fingerprint image is reduced, a fingerprint recognition rate is reduced. The embodiment of the disclosure controls an exposure time of the image sensor ISS, in order to improve a fingerprint recognition rate of a bad image fingerprint having a low sharpness of a fingerprint image.

In embodiments disclosed herein, the "bad image fingerprint" is a term that contrasts with a general fingerprint having a high fingerprint recognition rate obtained from a high sharpness of a fingerprint image. The sharpness of the fingerprint image may be determined by a contrast (hereinafter referred to as "ridge-valley contrast") between ridges and valleys of a fingerprint image obtained from the image sensor ISS. The bad image fingerprint has a lower sharpness than the general fingerprint because a ridge-valley contrast of a fingerprint image obtained from the image sensor ISS is relatively low. Hence, the bad image fingerprint means a fingerprint having a low fingerprint recognition rate when the image sensor is driven under the same conditions as the general fingerprint. Hereinafter, embodiments of the disclosure use a dry fingerprint an example of the bad image fingerprint, but are not limited thereto.

Figure 5:
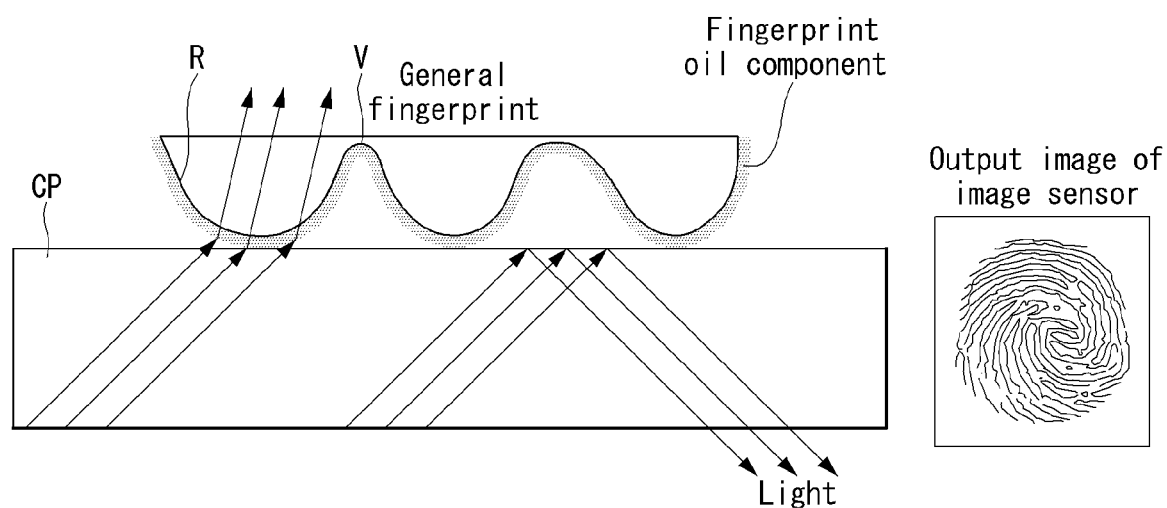
FIG. 5 illustrates an example of a general fingerprint.
Figure 6:
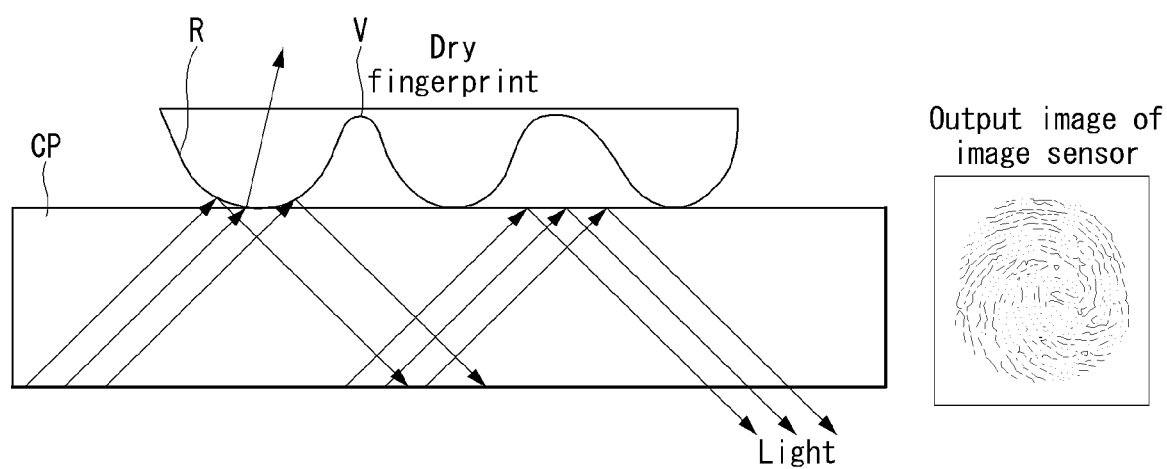
FIG. 6 illustrates an example of a dry fingerprint.

FIGS. 5 and 6 illustrate a difference between a general fingerprint and a dry fingerprint.

As shown in FIGS. 5 and 6, a dry fingerprint has a smaller contact area of the fingerprint than a general fingerprint, and an oil component of the dry fingerprint is insufficient as compared to the general fingerprint. In the general fingerprint, light is absorbed in ridges R. On the other hand, in the dry fingerprint, light is reflected from ridges R and is totally reflected to the transparent substrate CP. As a result, when data output from the image sensor ISS is displayed as an image, a ridge pattern is broken in the dry fingerprint. Therefore, the dry fingerprint has a smaller ridge-valley contrast than the general fingerprint, and a rate of the ridge pattern of the dry fingerprint decreases in the same contact area of the fingerprint.

When viewed from an output image of the image sensor ISS, the ridges R of the dry fingerprint are output as a grayscale value of a grey level. Therefore, when a grayscale difference between ridges R and valleys V is expressed as 100% in the general fingerprint, a grayscale difference in the dry fingerprint is equal to or less than 30%. When viewed from the output image of the image sensor ISS, because the ridge pattern of the dry fingerprint is broken, an area occupied by the ridges R in the dry fingerprint is equal to or less than 50% of that in the general fingerprint.

Figure 7:
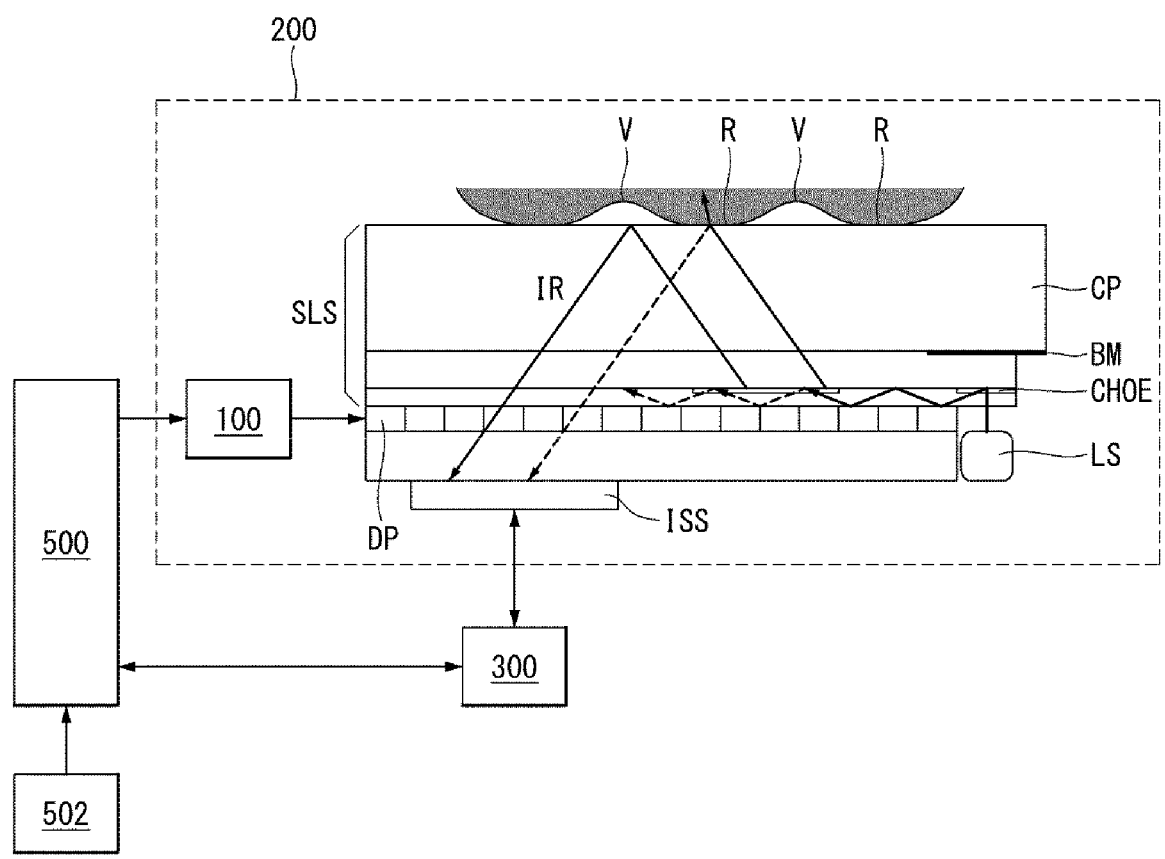
FIG. 7 is a block diagram of a mobile terminal according to an embodiment of the disclosure.

FIG. 7 is a block diagram of a mobile terminal according to an embodiment of the disclosure.

Referring to FIG. 7, a mobile terminal according to an embodiment of the disclosure includes a display device 200, an image sensor controller 300, and a host system 500.

The display device 200 includes a display panel DP, a display panel driver 100, a fingerprint recognition device, and the like. The fingerprint recognition device includes a directional light source device SLS disposed on the display panel DP and an image sensor ISS disposed below the display panel DP. The fingerprint recognition device, as described above, irradiates a surface light source onto the display panel DP and senses a fingerprint pattern contacting a transparent substrate CP on a screen of the display panel DP.

The screen of the display panel DP includes a pixel array displaying an input image. The pixel array includes a plurality of data lines, a plurality of gate lines (or referred to as "scan lines") intersecting the data lines, and pixels arranged in a matrix. Each pixel may include a red subpixel, a green subpixel, and a blue subpixel for color implementation. Each pixel may further include a white subpixel. Each subpixel includes a pixel circuit.

Touch sensors may be disposed on the display panel DP. A touch input may be sensed using separate touch sensors or sensed through the pixels. The touch sensors may be implemented as on-cell touch sensors or add-on touch sensors and disposed on the screen of the display panel DP. Alternatively, the touch sensors may be implemented as in-cell touch sensors that are embedded in the pixel array.

The display panel driver 100 writes pixel data of an input image to the pixels of the display panel DP and displays the input image on the screen of the display panel DP. The display panel driver 100 includes a data driver, a gate driver, and a timing controller. The display panel driver 100 may further include a touch sensor driver for driving the touch sensors. In mobile devices or wearable devices, the data driver, the timing controller, and a power circuit may be integrated into one integrated circuit.

The data driver converts digital data of an input image received from the timing controller into analog gamma compensation voltages using a digital-to-analog converter (DAC) in each frame period and outputs a data voltage. The gate driver may sequentially supply gate signals synchronized with the data voltage to gate lines using a shift register under the control of the timing controller.

The timing controller receives digital data of an input image and timing signals synchronized with the digital data from the host system 500. The timing controller transmits the digital data of the input image to the data driver and controls operation timings of the data driver and the gate driver.

The image sensor controller 300 transmits fingerprint image data received from the image sensor ISS to the host system 500 and controls an exposure time of the image sensor ISS.

The host system 500 controls an entire function of the mobile terminal. The host system 500 may be implemented as an application processor (AP). The host system 500 is connected to peripheral devices (not shown) and controls input and output operations between the peripheral devices. The host system 500 is connected to an input unit 502, an output unit, a sensor unit, a communication unit, an interface unit, a memory, a power supply unit, etc. that are omitted in the drawings.

The input unit 502 includes a microphone, a touch screen, a keypad, and the like. The user may set or change a fingerprint recognition mode through the input unit 502 connected to the host system 500. The output unit may include the display device 200, an acoustic output module, a haptic module, an optical output module, and the like.

The sensor unit may include the touch sensor, the image sensor ISS, a heart rate sensor, a proximity sensor, an illumination sensor, an acceleration sensor, a magnetic sensor, a G-sensor, a gyroscope sensor, a motion sensor, an RGB sensor, an infrared sensor, a fingerprint scan sensor, an ultrasonic sensor, a biometric sensor (for example, a fingerprint sensor and an iris recognition sensor), etc. that are disposed on the screen of the display panel DP. The image sensor ISS may include a camera.

The communication unit may include at least one of a broadcast receiving module, a mobile communication module, a wireless Internet module, a short-range communication module, and a location information module.

The interface unit provides an interface between the host system 500 and an external device. The interface unit may include at least one of wired or wireless headset ports, external charger ports, wired or wireless data ports, memory card ports, ports for connecting a device including an identification module, audio input/output (I/O) ports, video I/O ports, and earphone ports. The memory may store application programs or applications, and predetermined data or instructions for controlling various operations of mobile devices or wearable devices. At least some of the application programs may be downloaded from an external server via wireless communication. Further, other application programs may be stored in the memory at time of manufacturing or shipping, which is typically the case for basic functions of the mobile terminal. Examples of the basic functions include receiving a call, placing a call, receiving a message, sending a message, and the like.

The host system 500 transmits image data received from the broadcast receiving module or the peripheral devices to the display panel driver 100. The host system 500 generates touch coordinates by analyzing touch data, etc. and executes an application associated with the touch coordinates. The host system 500 compares a fingerprint image received through the image sensor controller 300 with a previously registered fingerprint image and performs fingerprint authentication.

Figure 8:
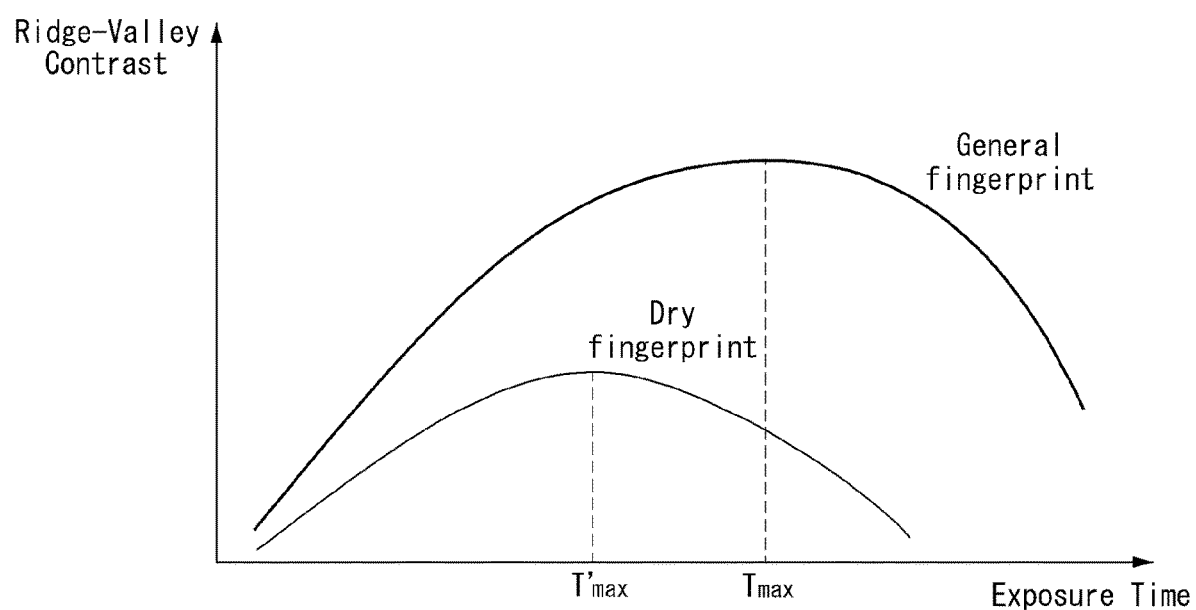
FIG. 8 illustrates changes in a ridge-valley contrast of each of a general fingerprint and a dry fingerprint depending on an exposure time of an image sensor.

The inventors confirmed through an experiment that a sharpness of a fingerprint varied depending on an exposure time of the image sensor ISS. According to the experiment, when the exposure time of the image sensor ISS increased, the sharpness of the fingerprint, i.e., a ridge-valley contrast increased. When the exposure time of the image sensor ISS increased to a critical time (Tmax and T'max) or more as shown in FIG. 8, the ridge-valley contrast of the fingerprint was rather reduced. More specifically, when the exposure time of the image sensor ISS increases to the critical time (Tmax and T'max) or more, a difference between reflection and absorption characteristics resulting from a refractive index difference between the ridges and the valleys of the fingerprint does not increase. Hence, an amount of light, that is absorbed in the human skin and is scattered again, increases, thereby serving as a light noise.

According to the experimental result, it was confirmed that an optimum value (i.e., a maximum value) of the ridge-valley contrast of the fingerprint depending on a fingerprint state was determined depending on an exposure time of the image sensor ISS. For example, as shown in FIG. 8, a critical time T'max at which a ridge-valley contrast of a dry fingerprint had a maximum value was earlier than a critical time Tmax at which a ridge-valley contrast of a general fingerprint had a maximum value. Thus, a ridge-valley contrast of a fingerprint having a maximum fingerprint recognition rate may vary depending on a fingerprint state and a surrounding environment of the user. The present inventors confirmed that a fingerprint recognition rate of a bad image fingerprint can be increased by varying the exposure time of the image sensor ISS depending on a fingerprint state of the image sensor ISS based on the experimental result. In FIG. 8, an exposure time T'max for the dry fingerprint is less than an exposure time for general (or wet) fingerprint.

The user can select an optimum fingerprint recognition rate of his or her fingerprint while varying the exposure time of the image sensor ISS through a calibration mode provided by the mobile terminal. The user can input an exposure time of the image sensor ISS when the high fingerprint recognition rate of his/her fingerprint is obtained, using an input device connected to the host system 500.

The display module maker may provide a set maker with a display module including the display device 200. The set maker may manufacture a mobile terminal by connecting the host system 500 to the display module provided by the display module maker. The display module maker or the set maker can previously select an exposure time of the image sensor ISS depending on a usage environment at the time of shipment of the mobile terminal. For example, the display module maker or the set maker may set an exposure time of the image sensor ISS in a dry environment to be less than that in a wet environment.

The image sensor controller 300 may control an exposure time of the image sensor ISS by a global shutter method. The global shutter method controls all the pixels SS of the image sensor ISS at the same exposure time. A method for controlling the exposure time using the global shutter method simultaneously initializes photodiodes of all the pixels SS of the image sensor ISS and then converts a current flowing from the photodiodes into a voltage at the same time intervals, thereby capturing an image.

The image sensor controller 300 may vary the exposure time of the image sensor ISS using the global shutter method depending on user command, a contrast ratio of a fingerprint image obtained from the image sensor ISS, or a predetermined command code (e.g., a register setting value). In addition, the image sensor controller 300 may successively obtain an image of a fingerprint pattern at two or more predetermined exposure times two or more times, select an image having a higher ridge-valley contrast among the obtained images of the fingerprint pattern, and transmit the selected image to the host system 500. In one embodiment, the image sensor controller 300 controls an exposure time of the image sensor to obtain a fingerprint image based on a contrast ratio of the fingerprint image. That is, the image sensor controller 300 may capture multiple fingerprint images using different exposure times and choose the fingerprint image having a highest ridge-valley contrast from among the multiple fingerprint images. Thus, the image sensor controller 300 is able to identify the exposure time that resulted in the fingerprint image having the highest ridge-valley contrast.

Figure 9:
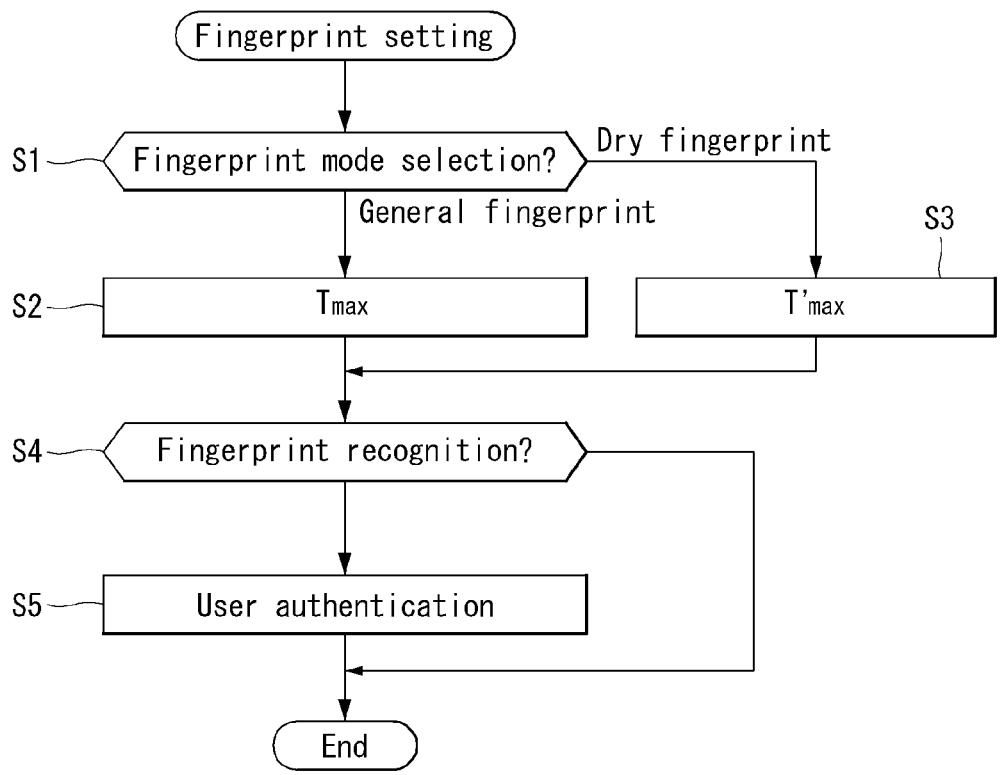
FIG. 9 is a flow chart illustrating a method for obtaining a fingerprint image according to a first embodiment of the disclosure.
Figure 10:
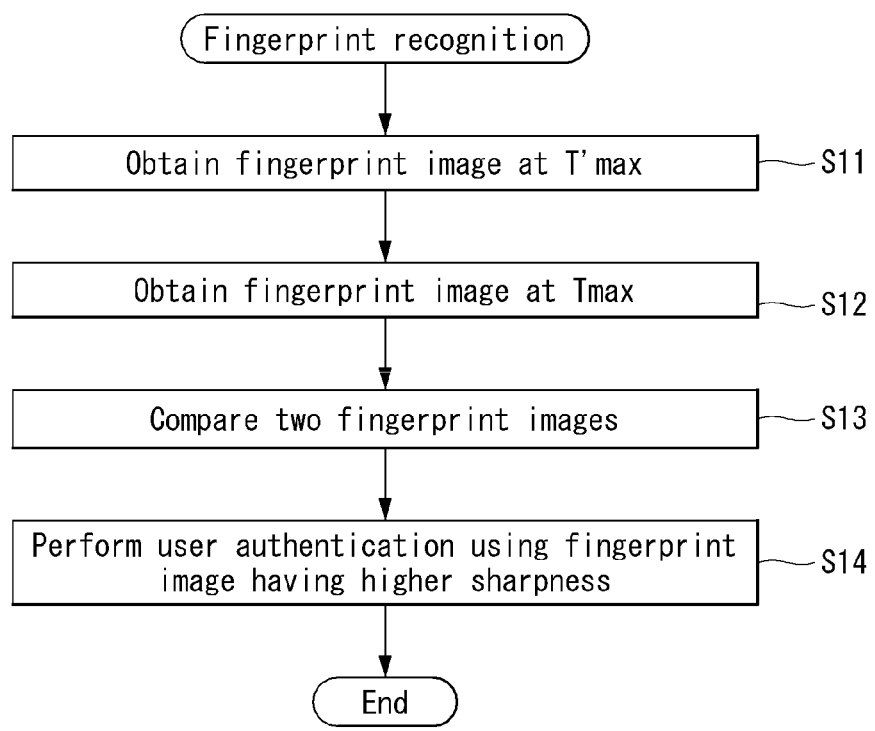
FIG. 10 is a flow chart illustrating a method for obtaining a fingerprint image according to a second embodiment of the disclosure.

After the mobile terminal has been shipped and delivered to the user, the user can obtain a fingerprint image through a method illustrated in FIGS. 9 and 10.

FIG. 9 is a flow chart illustrating a method for obtaining a fingerprint image according to a first embodiment of the disclosure.

Referring to FIG. 9, the user may select a fingerprint mode from a fingerprint recognition setting of the mobile terminal in step S1. The host system 500 transmits a code of the fingerprint mode selected according to user data input through the input unit to the image sensor controller 300. The image sensor controller 300 controls an exposure time of the image sensor ISS to an exposure time of the image sensor defined in the fingerprint mode selected by the user.

When the user selects a general fingerprint, the image sensor controller 300 controls the exposure time of the image sensor ISS to a first critical time Tmax as shown in FIG. 8 in step S2. The first critical time Tmax is set to an optimum exposure time at which a sharpness (i.e., a ridge-valley contrast) of a fingerprint image obtained by the image sensor ISS in the general fingerprint has a maximum value.

When the user selects a dry fingerprint, the image sensor controller 300 controls the exposure time of the image sensor ISS to a second critical time T'max as shown in FIG. 8 in step S3. The second critical time T'max is set to an optimum exposure time at which a sharpness (i.e., a ridge-valley contrast) of a fingerprint image obtained by the image sensor ISS in the dry fingerprint has a maximum value.

When a fingerprint recognition event occurs in step S4, the image sensor controller 300 controls the exposure time of the image sensor ISS determined in step S2 or step S3. The image sensor ISS senses a fingerprint contacting the transparent substrate CP for the exposure time determined in step S2 or step S3 under the control of the image sensor controller 300 and outputs fingerprint image data. The host system 500 compares the fingerprint image received from the image sensor controller 300 with a previously registered fingerprint image and performs fingerprint authentication in step S5.

In addition, a critical time different from the second critical time T'max may be set to an optimum exposure time based on an experimental result of bad image fingerprints other than the dry fingerprint.

FIG. 10 is a flow chart illustrating a method for obtaining a fingerprint image according to a second embodiment of the disclosure.

Referring to FIG. 10, when a fingerprint recognition event occurs, the image sensor ISS successively senses a fingerprint at two or more exposure times and generates two or more fingerprint image data at the two or more exposure times. For example, a first fingerprint image of a current fingerprint contacting the transparent substrate may be obtained at a second critical time T'max in step S11, and then a second fingerprint image of the current fingerprint may be obtained at a first critical time Tmax in step S12.

The image sensor controller 300 selects the fingerprint image having a higher sharpness (i.e., a higher ridge-valley contrast) among the first and second fingerprint images received from the image sensor ISS and transmits the selected fingerprint image to the host system 500. The host system 500 compares the fingerprint image received from the image sensor controller 300 with a previously registered fingerprint image at step S13 and performs fingerprint authentication in step S14. The host system 500 allows access to the display device 200 responsive to the sensed fingerprint matching the previously stored fingerprint.

As described above, the embodiments of the disclosure optimize an exposure time of the image sensor depending on a fingerprint state and an environment of the user and thus can increase a fingerprint recognition rate. As a result, the embodiments of the disclosure can improve the fingerprint recognition rate irrespective of the fingerprint state and the environment of the user.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fingerprint recognition system comprising:
a display panel configured to display an image on a screen;
a light source device configured to irradiate light onto a transparent substrate disposed on the screen of the display panel;
an image sensor configured to:
sense a fingerprint during a first exposure time when a first fingerprint mode is selected and obtain a first fingerprint image with light reflected from the fingerprint contacting the transparent substrate on the screen; and
sense the fingerprint during a second exposure time that is different from the first exposure time when a second fingerprint mode is selected and obtain a second fingerprint image; and
an image sensor controller configured to control the first and second exposure times of the image sensor to obtain the first fingerprint image or the second fingerprint image to be used for a fingerprint authentication according to the selection of the first and second fingerprint modes.

2. The fingerprint recognition system of claim 1, wherein the first fingerprint mode and the second fingerprint mode are selected by a user.

3. The fingerprint recognition system of claim 1, wherein a fingerprint image having a higher contrast ratio among the first fingerprint image and the second fingerprint image is used in fingerprint authentication.

4. The fingerprint recognition system of claim 1, wherein the image sensor controller is configured to transmit the first and the second fingerprint images received from the image sensor to a host system.

5. The fingerprint recognition system of claim 4, wherein the host system performs fingerprint authentication based on the first fingerprint image obtained for the first exposure time in the first fingerprint mode,
wherein the host system performs fingerprint authentication based on the second fingerprint image obtained for the second exposure time in the second fingerprint mode.

6. A method for sensing a fingerprint using a fingerprint recognition display device including an image sensor, the method comprising:
sensing a fingerprint during a first exposure time when a first fingerprint mode is selected and obtaining a first fingerprint image with light reflected from the fingerprint contacting the fingerprint recognition display device;
sensing the fingerprint during a second exposure time that is different from the first exposure time when a second fingerprint mode is selected and obtaining a second fingerprint image; and
controlling the first and second exposure times of the image sensor to obtain a the first fingerprint image or the second fingerprint image to be used for a fingerprint authentication according to the selection of the first and second fingerprint modes.

7. The method of claim 6, further comprising:
receiving a selection of either the first fingerprint mode or the second fingerprint mode;
selecting either the first exposure time or the second exposure time of the image sensor of the fingerprint recognition display device based on the received selection of either the first fingerprint mode or the second fingerprint mode;
sensing the fingerprint on the fingerprint recognition device using the selected exposure time;
comparing the sensed fingerprint with a previously stored fingerprint; and
allowing access to the fingerprint recognition display device responsive to the sensed fingerprint matching the previously stored fingerprint.

8. The method of claim 6, wherein the first fingerprint mode or the second fingerprint mode is selected based on a state of the fingerprint.

9. The method of claim 8, wherein the state of the fingerprint comprises either the fingerprint being dry or wet.

10. The method of claim 9, wherein an exposure time for the first fingerprint mode based on the state of the fingerprint being dry is less than an exposure time for the second fingerprint mode based on the state of the fingerprint being wet.

11. The fingerprint recognition system of claim 1, wherein the image sensor is configured to be disposed under the display panel to sense the fingerprint contacted on the transparent substrate.

12. The fingerprint recognition system of claim 1, wherein the exposure time of the image sensor is set differently depending on the fingerprint condition and a surrounding environment of the fingerprint recognition system.

13. The fingerprint recognition system of claim 1, further comprising a directional light source device including:
a second low refractive index layer on the display panel;
a light exiting element overlapped with the display panel on the low refractive index layer;
a light entering element neighbored to the light exiting element on the low refractive index layer;
a first low refractive index layer on the light exiting element and the light entering element;
a transparent substrate on the first low refractive index layer; and
a light source disposed at lateral of the display panel to be overlapped with the second low refractive index layer, light entering element, first low refractive index layer and transparent substrate.

* * * * *